OR 3,924,932

United States

Yamamoto

[11] 3,924,932
[45] Dec. 9, 1975

[54] LIQUID CRYSTAL DISPLAY UTILIZING REFLECTED LIGHT

[75] Inventor: Mititaka Yamamoto, Los Altos, Calif.

[73] Assignee: Omron Corporation of America, Mountain View, Calif.

[22] Filed: Aug. 9, 1974

[21] Appl. No.: 496,193

[52] U.S. Cl............................. 350/160 LC; 350/150
[51] Int. Cl.[2]............................................ G02F 1/13
[58] Field of Search...................... 350/150, 160 LC

[56] References Cited
UNITED STATES PATENTS

| | | | |
|---|---|---|---|
| 3,869,196 | 3/1975 | Kubota | 350/160 LC |
| 3,881,807 | 5/1975 | Hosokawa et al. | 350/160 LC |

*Primary Examiner*—Edward S. Bauer
*Attorney, Agent, or Firm*—Flehr, Hobbach, Test, Albritton & Herbert

[57] ABSTRACT

Apparatus for increasing the contrast ratio in a liquid crystal display by increasing the intensity of ambient light which is available to the eye of an observer. The usual liquid crystal display assembly utilizing a twist nematic or field effect liquid crystal in the reflective mode has a top polarizer, transparent support members on either side of a liquid crystal layer, transparent electrodes arranged in predetermined fashion on opposite sides of the liquid crystal layer in electrical contact therewith, a bottom polarizer and a light reflector adjacent to the bottom polarizer. In this disclosure, the top polarizer is removed from the liquid crystal display assembly and placed at an angle relative to the surface thereof. The top polarizer is in such a position as to intercept ambient light which has initially passed through and then been reflected back through the liquid crystal display. The reflected light is polarized in predetermined patterns as determined by electric fields created between electrodes on opposite sides of the liquid crystal layer and thereby provides a light/dark pattern to a viewer positioned on the side of the top polarizer away from that approached by the reflected light. High contrast ratios result as available ambient light energy is conserved by requiring to pass through the top polarizer only once.

4 Claims, 4 Drawing Figures

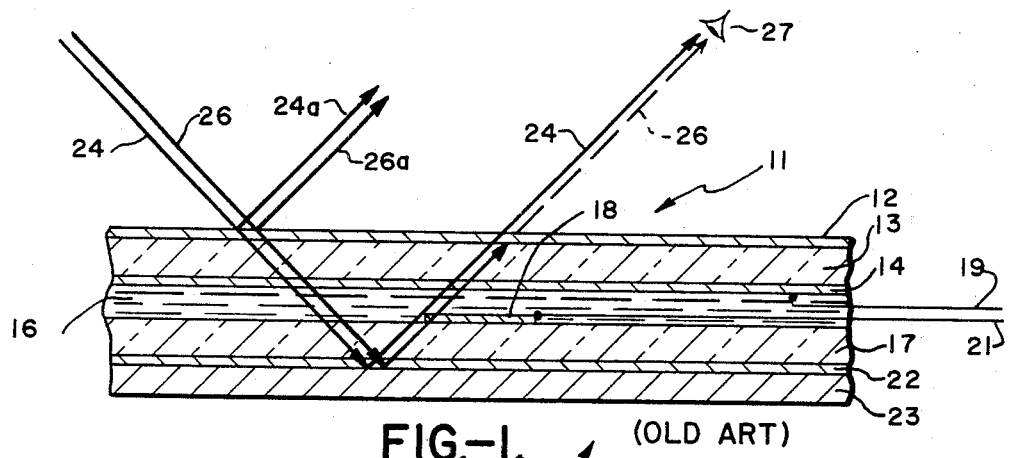
FIG.-1 (OLD ART)
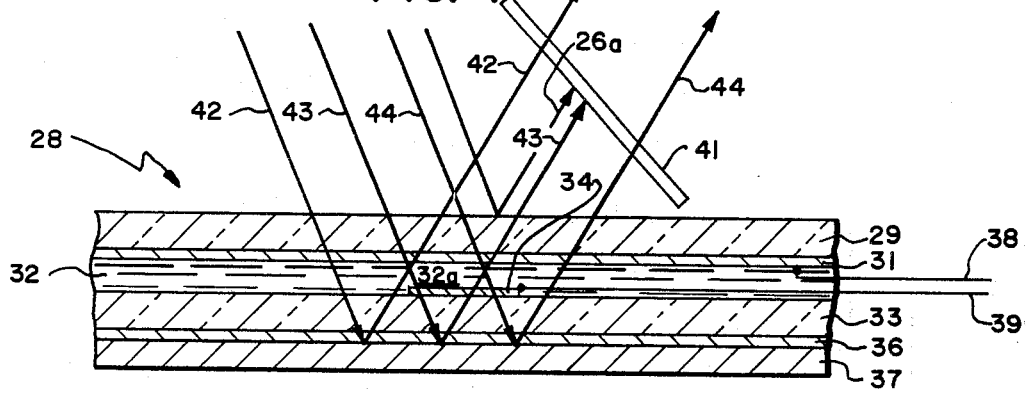
FIG.-2
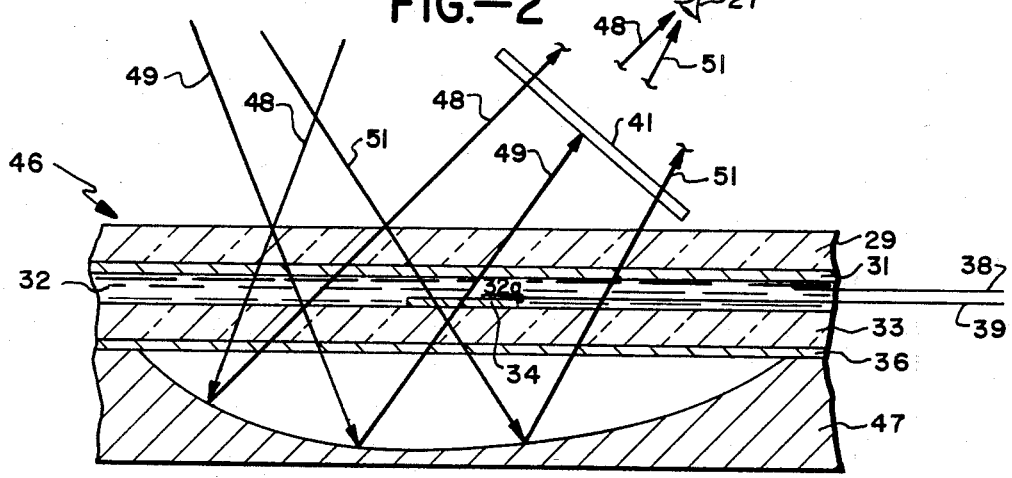
FIG.-3
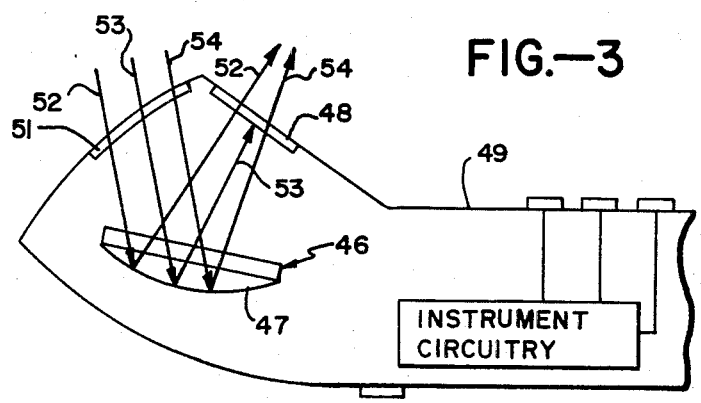
FIG.-4

LIQUID CRYSTAL DISPLAY UTILIZING REFLECTED LIGHT

BACKGROUND OF THE INVENTION

1. Field of the Invention

This invention relates to a high contrast ratio liquid crystal display, and more particularly to such a display utilizing the liquid crystal display in a reflective mode and making maximum use of available ambient light.

2. Description of the Prior Art

Present liquid crystal displays using the reflective mode require a predetermined minimum ambient light intensity for providing sufficient contrast ratio in the display for satisfactory interpretation of the display by an observer. In the case of the liquid crystal display using a twist nematic or field effect liquid crystal, a layered assembly comprising a top polarizer, a top support plate, a top electrode, a liquid crystal, a predetermined pattern or array of bottom electrodes, a bottom support plate, a bottom polarizer and a reflector is used. The top and bottom polarizers are generally oriented with their polarization axes orthogonal. When ambient radiant energy passes from one substance or median to another, some of it is reflected and the remainder passes into the second substance, where some is absorbed and some is transmitted therethrough. That portion of the ambient radiant energy which is reflected and absorbed as it passes through the liquid crystal assembly is no longer available at a point of observation to provide contrast between the areas on the liquid crystal display which pass reflected light and those areas which block reflected light. The primary elements within the display assembly which reflect and absorb radiant energy as it passes therethrough are the polarizing elements. There is therefore a need for reducing the reflected and absorbed visible radiant energy as it passes thru the display assembly so that higher contrast ratios may be seen by an observer of the display.

SUMMARY AND OBJECTS OF THE INVENTION

A combination is provided which includes a liquid crystal display assembly having in layered sequence a top transparent support plate, a covering transparent electrode, a liquid crystal in electrical contact with the covering electrode, a predetermined pattern of transparent electrodes in electrical contact with the opposite side of the liquid crystal layer, a lower transparent support plate for mounting the predetermined pattern of electrodes, a light polarizer and a reflector. A second polarizer is arranged in an inclined position relative to the outside surface of the top transparent support plate. Ambient light energy may thereby impinge on the display assembly for direct and reflected transmission therethrough without passing through the second light polarizer. Thus, that light energy which would otherwise be reflected or absorbed by initial transmission through the second light polarizer is conserved. The conserved ambient light energies provide for higher contrast ratios to the eye of an observer of the display.

In general, it is an object of the invention to provide a liquid crystal display in the reflective mode which provides higher contrast ratios for given ambient light intensities.

It is another object of the present invention to provide a liquid crystal display which concentrates existing ambient light on the face of the display.

Additional objects and features of the invention will appear from the following description in which the preferred embodiments have been set forth in detail in conjunction with the accompanying drawings.

BRIEF DESCRIPTION OF THE DRAWINGS

FIG. 1 shows a prior art reflective liquid crystal display assembly.

FIG. 2 shows an embodiment of a reflective liquid crystal display assembly according the present invention.

FIG. 3 shows a second embodiment of a reflective liquid crystal display assembly according to the present invention.

FIG. 4 shows the embodiment of FIG. 3 mounted in a case.

DESCRIPTION OF THE PREFERRED EMBODIMENTS

Reference is first made to FIG. 1 in the drawings to describe a prior art liquid crystal display assembly which illustrates use in the reflective mode. A sequence of layers includes a first light polarizer 12 adjacent to a first transparent support plate 13. A covering transparent electrode 14 is disposed on one side of first support plate 13. A liquid crystal 16 of the twist nematic or field effect type is located in electrical contact with covering electrode 14. A second support plate 17 is disposed adjacent to liquid crystal 16 having thereon a pattern or array of transparent electrodes 18 in electrical contact with liquid crystal 16 on the side opposite that contacted by covering electrode 14. Electrical leads 19 and 21 are connected to covering electrode 14 and the array of electrodes 18 respectively for providing electrical access thereto. A second light polarizer 22 is positioned adjacent to second support plate 17 and a reflector 23 is positioned adjacent to second light polarizer 22.

The first and second light polarizers 12 and 22 respectively may be arranged in the assembly 11 so that their polarization axes are orthogonal. A light ray 24 is seen impinging on the surface of liquid crystal display 11 passing through first light polarizer 12, thereby assuming an X planar polarization. A portion of the light energy in ray 24 is reflected from the surface of the first light polarizer 12 and lost as shown in 24a. Some amount of the light energy in ray 24 is also lost as it is absorbed in the material of the first light polarizer 12. The remaining light energy in light ray 24 is transmitted through liquid crystal 16 having its plane of polarization twisted through 90°, by virtue of the characteristics of the liquid crystal, thereby approaching second light polarizer 22 having a Y polarization. Since second light polarizer 22 is aligned to pass light having orientation, light ray 24 is passed thereby to impinge upon the surface of reflector 23. Reflector 23 returns the Y polarized light through second light polarizer 22 where it again passes through liquid crystal 16, being rotated through 90° as it passes therethrough. Light ray 24 approaches first light polarizer 12 with an X polarization orientation and it is passed by polarizer 12 also.

If an electrical potential of sufficient magnitude is applied to electrical leads 19 and 21 connected to covering electrode 14 and predetermined ones of the array of electrodes 18, liquid crystal 16 no longer displays the twisting effect on polarized light within that volume of liquid crystal 16 situated between electrodes between which the sufficient electrical potential difference exists. Assuming such an electrical potential applied to leads 19 and 21, light ray 26 impinging upon the surface of liquid crystal display 11 will be treated in a fashion similar to light ray 24 as it passes through display layers to impinge upon the surface of reflector 23. Light ray 26, polarized in the Y direction, proceeds from the surface of reflector 23 through transparent electrodes 18 and through that volume of liquid crystal 16 positioned between electrodes 18 and 14. As described above, light ray 26 polarized in the Y direction is undisturbed in that polarization orientation as it passes through the volume of liquid crystal 16 across which the electrical potential is imposed. Reflected polarized light ray 26 is therefore blocked by the X orientation of first light polarizer 12, and the corresponding point on polarizer 12 is seen as a dark area by an observer's eye 27. In this fashion, a contrast is seen between areas on the surface of the display 11 which pass light ray 24 and which block light ray 26.

The contrast ratio of the configuration of FIG. 1 suffers by virtue of reflected rays 24a and 26a. If they are directed to the observer's eye 27, the light-dark contrast between reflected rays 24 and 26 is diminished by the flooding of the observation point with reflected light.

Turning now to FIG. 2, a principle of the disclosed invention will be described. A layered liquid crystal assembly 28 is shown having a first support plate 29, a covering transparent electrode 31, a liquid crystal of the twist nematic or field effect type 32 in electrical contact with electrode 31, a second support plate 33, a pattern or array of transparent electrodes 34 on the second support plate 33 in electrical contact with the liquid crystal 32, a light polarizer 36 and a light reflector 37. A pair of electrical leads 38 and 39 are attached to covering electrode 31 and individual ones of the array of electrodes 34 respectively.

An inclined light polarizer 41 is positioned on the observer's side of the liquid crystal assembly 28 inclined relative to the surface of first support plate 29. Reflected light approaches inclined polarizer 41 on the side thereof, forming an acute angle with the surface of first support plate 29. Observation of the display is made from the side of inclined polarizer 41 forming an obtuse angle with the surface of first support plate 29.

As may be seen in FIG. 2, a ray of ambient light energy 42 impinges directly on the surface of first support plate 29 without having to traverse a polarizing layer. Ray 42 is transmitted through liquid crystal layer 32 to impinge upon light polarizer 36 still having substantially all of its ambient intensity characteristics. Light polarizer 36 is oriented in a Y direction, polarizing ray 42, whereupon reflector 37 reflects the Y polarized light back through light polarizer 36. The Y polarized light 42 is twisted through 90° to an X polarization orientation as described above, whereupon it approaches inclined polarizer 41, having an X polarization axis, which passes light 42 therethrough.

When an electrical potential of sufficient magnitude is impressed across leads 38 and 39, an electrical field is set up on volume of liquid crystal 32a which lies directly between covering transparent electrode 21 and the surface area defined by that segment of the array of transparent electrodes 34. When a light ray such as ray 43 impinges upon the surface of liquid crystal assembly 28 it also passes through to the surface of reflector 37 losing only that light energy reflected and absorbed by single light polarizer 36. Ray 43 is also polarized in the Y direction by polarizer 36 whereupon it is reflected through the volume of liquid crystal 32 designated 32a. When an electric field exists within the volume 32a, the Y orientation of polarization is undisturbed as the ray passes therethrough, whereupon it impinges on inclined polarizer 41 having a polarization orthogonal to the polarization axis thereof and is blocked by polarizer 41.

An additional ambient light ray 44 is shown to illustrate the path of an ambient light ray which would be passed by inclined polarizer 41 in the same fashion as ambient light ray 42 is passed. As FIG. 2 shows, an image may appear to an observer on the side of inclined polarizer 41 describing an obtuse angle with the surface of first support plate 29 when an electrical potential of sufficient magnitude is impressed across leads 38 and 39. The potential forms electrical fields as described heretofore producing light and dark areas on the display created by passage and blockage of polarized light at inclined polarizer 41.

Light reflected from a surface such as the upper surface of support plate 29 may be represented by ray 26a in FIG. 2. Such light is polarized. If top polarizer 41 is oriented with its polarizing axis oriented perpendicular to the polarization of ray 26a, it will thus be barred by polarizer 41 and high contrast ratios as described above may be maintained.

Reference is next made to FIG. 3 wherein a liquid crystal assembly 46 is shown having layers similar to those shown in liquid crystal assembly 28. Similar layers in liquid crystal assembly 46 are assigned like item numbers to the corresponding layers in liquid crystal assembly 28. Electrical leads 38 and 39 in FIG. 3 correspond to leads 38 and 39 in FIG. 2. A reflector 47 is shown in FIG. 3 for concentrating ambient light across the back of inclined polarizer 41. As may be seen, ambient light impinging upon the surface of first support plate 29 passes liquid crystal assembly 46 without being subjected to losses due to reflection and absorption in an initial polarizing layer. The ambient light rays 48, 49 and 51 are transmitted through liquid crystal assembly 46 in the same fashion as described for light rays 42, 43 and 44 respectively in FIG. 2 above. Ambient light is focused by reflector 47 on the rear of inclined polarizer 41 at a higher intensity because these rays have not been required to transit inclined polarizer 41 prior to impinging on the back thereof. Light rays 48 and 51 have been broken away and are shown converging at the eye 27 of an observer positioned on the side of inclined polarizer 41 which describes an obtuse angle with the surface of first support plate 29.

FIG. 4 shows an embodiment of the present invention which incorporates liquid crystal assembly 46 including reflector 47 of the type which will direct or concentrate a major portion of the ambient light to impinge upon the rear side of the inclined polarizer 48 which is mounted in a case 49. A rear window 51, which may be open or may have a transparent cover inserted therein, is situated to pass ambient light rays as shown at 52, 53 and 54 to impinge upon reflector 47 in liquid crystal assembly 46. Liquid crystal assembly 46 may be oriented about a horizontal axis (perpendicular to the plane of the drawing FIG. 4) to direct the majority of the available ambient light across the back of inclined polarizer 48. In this manner, an observer, positioned to see the face or exterior of inclined polarizer 48, may observe the liquid crystal display showing light areas corresponding to transmitted reflected rays 52 and 54 and dark areas corresponding to blocked reflected ray 53.

A liquid crystal display assembly has been disclosed which minimizes loss due to reflection and absorption of ambient light energies, thereby providing satisfactory contrast ratios at the face of the display for readability at low ambient light intensity levels.

I claim:

1. In combination with a liquid crystal assembly of the type having sequential layers including a first transparent support plate, a covering transparent electrode attached to one side of the first support plate, a field effect liquid crystal in electrical contact with the covering transparent electrode, a second transparent support plate adjacent to the field effect liquid crystal, a predetermined array of transparent electrodes attached to one side of the second transparent support plate in electrical communication with the field effect liquid crystal, and a first light polarizer attached to the other side of the second transparent support plate, a second polarizer inclined relative to the other side of the first transparent support plate, and a reflector in juxtaposition with the first polarizer, whereby ambient light incident on the first transparent support plate on the side of said second polarizer forming an acute angle therewith may pass through the liquid crystal assembly, impinge on said reflector, and pass back through the liquid crystal assembly to impinge on said second polarizer, so that ambient light energy loss due to reflected and absorbed energy is limited to that occurring during transmission of the ambient light energy through said first polarizer twice and said second polarizer once, whereby an observer positioned on the side of said second polarizer forming an obtuse angle with the first transparent support plate may observe greater light and dark contrast according to the polarization of the reflected light as determined by electric fields applied between the covering transparent and predetermined array of transparent electrodes.

2. A combination as in claim 1 wherein said reflector has a focal point on the side of said second polarizer forming an obtuse angle with the first support plate, whereby reflected ambient light is concentrated on the back of said second polarizer.

3. A combination as in claim 2 together with an outer case for housing the liquid crystal display, said outer case having an opening therein for passing light incident on the first transparent support plate.

4. A combination as in claim 1 together with an outer case for housing the liquid crystal display, said outer case having an opening therein for passing light incident on the first transparent support plate.

* * * * *